United States Patent
Yang et al.

(10) Patent No.: US 8,958,335 B2
(45) Date of Patent: Feb. 17, 2015

(54) SYSTEM AND METHOD FOR CONTROLLING NETWORK DISCOVERY

(71) Applicant: FutureWei Technologies, Inc., Plano, TX (US)

(72) Inventors: Yunsong Yang, San Diego, CA (US); Young Hoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 119 days.

(21) Appl. No.: 13/875,944

(22) Filed: May 2, 2013

(65) Prior Publication Data

US 2013/0294270 A1    Nov. 7, 2013

Related U.S. Application Data

(60) Provisional application No. 61/642,940, filed on May 4, 2012.

(51) Int. Cl.
*H04W 48/16*    (2009.01)

(52) U.S. Cl.
CPC .................................. *H04W 48/16* (2013.01)
USPC ............................ 370/252; 370/254; 370/338

(58) Field of Classification Search
CPC . H04W 48/16; H04W 48/20; H04W 72/0406; H04W 8/005
USPC .................. 370/252, 254, 255, 328, 329, 338
See application file for complete search history.

(56) References Cited

U.S. PATENT DOCUMENTS

| 7,636,336 | B2* | 12/2009 | Forte et al. | 370/331 |
|---|---|---|---|---|
| 8,630,255 | B1* | 1/2014 | Kunz et al. | 370/331 |
| 2009/0075653 | A1* | 3/2009 | Yeom | 455/434 |
| 2013/0182611 | A1* | 7/2013 | Kneckt et al. | 370/255 |
| 2013/0237216 | A1* | 9/2013 | Ong et al. | 455/434 |

OTHER PUBLICATIONS

Emmelmann, M., "Fast Initial Link Set-Up PAR," IEEE P802.11 Wireless LANS, IEEE 802.11-10/1152r1, Sep. 15, 2010, pp. 1-3.
Kneckt, J.,et al., "802.11ai simulations," IEEE 11-12/279r0, Mar. 5, 2012, 21 pages.
Li, Y., et al. "AP discovery with FILS beacon," IEEE 802.11-12/004r4, Mar. 2012, 17 pages.

(Continued)

*Primary Examiner* — Ahmed Elallam
(74) *Attorney, Agent, or Firm* — Slater & Matsil, L.L.P.

(57) ABSTRACT

A method for discovering an access point of a communications system includes receiving an active scanning indicator, delaying transmission of a probe request of the station for a first amount of time in accordance with the active scanning indicator, and determining if the station is able to receive a matching probe request of a neighbor station during the first amount of time. The method also includes delaying transmission of the probe request for a second amount of time if the station is able to receive the matching probe request during the first amount of time, and determining if the station is able to receive a probe response corresponding to the matching probe request during the second amount of time. The method further includes transmitting the probe request if the station is not able to receive the probe response corresponding to the matching probe request during the second amount of time.

13 Claims, 10 Drawing Sheets

(56) References Cited

OTHER PUBLICATIONS

"IEEE Standard for information technology—Telecommunications and information exchange between systems Local and metropolitan area networks—Specific Requiements, Part 11: Wireless LAN Medium Access Control (MAC) and Physical Layer (PHY) Specifications," IEEE Std. 802.11™—2012 (Revision of IEEE Std 802.11-2007), IEEE Computer Society, Sponsored by the LAN/MAN Standards Committee, Mar. 29, 2013, 2,793 pages.

* cited by examiner

SYSTEM AND METHOD FOR CONTROLLING NETWORK DISCOVERY

This application claims the benefit of U.S. Provisional Application No. 61/642,940, filed on May 4, 2012, entitled "System and Method for Controlling Passive Scanning and Active Scanning," which application is hereby incorporated herein by reference.

TECHNICAL FIELD

The present disclosure relates generally to digital communications, and more particularly to a system and method for controlling network discovery.

BACKGROUND

Institute of Electrical and Electronics Engineers (IEEE) 802.11 is a set of standards for implementing wireless local area network (WLAN or WiFi) communication. A Task Group has been assigned to develop a standard for IEEE 802.11ai Fast Initial Link Set-up (FILS), which is referred to as IEEE 802.11 Task Group ai (TGai). IEEE 802.11ai FILS is intended to substantially reduce the time for a Wi-Fi station (STA) or handset (also commonly referred to as a mobile, a mobile station, a user, a terminal, a subscriber, and the like) to connect with a Wi-Fi access point (AP) (also commonly referred to as a base station, NodeB, enhanced NodeB, base terminal station, communications controller, and the like) by providing a media access control (MAC) layer protocol for fast authentication and association of a Wi-Fi handheld with a Wi-Fi access point.

In IEEE 802.11 Task Group ai (TGai), a need for Fast Initial Link Set-up (FILS) generally comes from an environment where mobile users are constantly entering and leaving the coverage area of an existing extended service set (ESS). Every time a station enters an ESS, the station performs an initial link set-up to establish WLAN connectivity. This generally requires efficient mechanisms that scale with a high number of users simultaneously entering the ESS, minimize the time spent within the initial link set-up phase, and securely provide initial authentication. The work scope of TGai may include improvements for access point/network discovery, secure authentication, and a mechanism to support concurrency in the exchange of higher layer protocol messages during the authentication phase.

SUMMARY OF THE DISCLOSURE

Example embodiments of the present disclosure which provide a system and method for controlling network discovery.

In accordance with an example embodiment of the present disclosure, a method for discovering an access point of a communications system is provided. The method includes receiving, by a station, an active scanning indicator, and delaying, by the station, transmission of a probe request of the station for a first amount of time in accordance with the active scanning indicator. The method also includes determining, by the station, if the station is able to receive a matching probe request of a neighbor station during the first amount of time, and delaying, by the station, transmission of the probe request for a second amount of time if the station is able to receive the matching probe request during the first amount of time. The method further includes determining, by the station, if the station is able to receive a probe response corresponding to the matching probe request during the second amount of time, and transmitting, by the station, the probe request if the station is not able to receive the probe response corresponding to the matching probe request during the second amount of time.

In accordance with another example embodiment of the present disclosure, a method for controlling discovery of an access point is provided. The method includes measuring, by the access point, active scanning activity at the access point, and statistically controlling, by the access point, a station's ability to discover the access point.

In accordance with another example embodiment of the present disclosure, a station is provided. The station includes a receiver, a processor operatively coupled to the receiver, and a transmitter operatively coupled to the processor. The receiver receives an active scanning indicator. The processor delays transmission of a probe request of the station for a first amount of time in accordance with the active scanning indicator, determines if the station is able to receive a matching probe request of a neighbor station during the first amount of time, delays transmission of the probe request for a second amount of time if the station is able to receive the matching probe request during the first amount of time, and determines if the station is able to receive a probe response corresponding to the matching probe request during the second amount of time. The transmitter transmits the probe request if the station is not able to receive the probe response corresponding to the matching probe request during the second amount of time.

In accordance with another example embodiment of the present disclosure, an access point is provided. The access point includes a processor, and a transmitter operatively coupled to the processor. The processor measures active scanning activity at the access point, and generates an active scanning indicator in accordance with the active scanning activity as measured to statistically control a station's ability to discover the access point. The transmitter broadcasts the active scanning indicator.

One advantage of an embodiment is that the network discovery technique used by stations to perform access point/network discovery is determined in accordance with access point/network discovery load. As an example, when access point/network discovery load is high, a network discovery technique that does not add significant communications system overhead is used, while when access point/network discovery load is low, a network discovery technique that allows for rapid access point/network discovery is used.

A further advantage of an embodiment is that the network discovery technique may be dynamically adjusted to meet changing access point/network discovery load.

Yet another advantage of an embodiment is that an access point may set the network discovery technique(s) used by its individual stations, groups of stations, types of stations, sets of stations, all of its stations, or a combination thereof. In other words, the access point may set the network discovery technique(s) of a number, percentage, group, type, class, and the like, of stations that it is serving.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to controlling network discovery. For example, at a station, the station receives an active scanning indicator, delays transmission of a probe request of the station for a first amount of time in accordance with the active scanning indicator, and determines if the station is able to receive a matching probe request of a neighbor station during the first amount of time. The station also delays transmission of the probe request for a second amount of time if the station is able to receive the matching probe request during the first amount of time, determines if the station is able to receive a probe response corresponding to the matching probe request during the second amount of time, and transmits the probe request if the station is not able to receive the probe response corresponding to the matching probe request during the second amount of time. As another example, at an access point, the access point measures active scanning activity at the access point, and statistically controls a station's ability to discover the access point.

The present disclosure will be described with respect to example embodiments in a specific context, namely an IEEE 802.11 TGai compliant communications system that uses active scanning and passive scanning for access point/network discovery. The disclosure may also be applied, however, to other standards compliant, such as The Third Generation Partnership Project (3GPP) or Machine to Machine (e.g. oneM2M) technical standards, and non-standards communications systems that use scanning for access point/network discovery.

Figure 1:
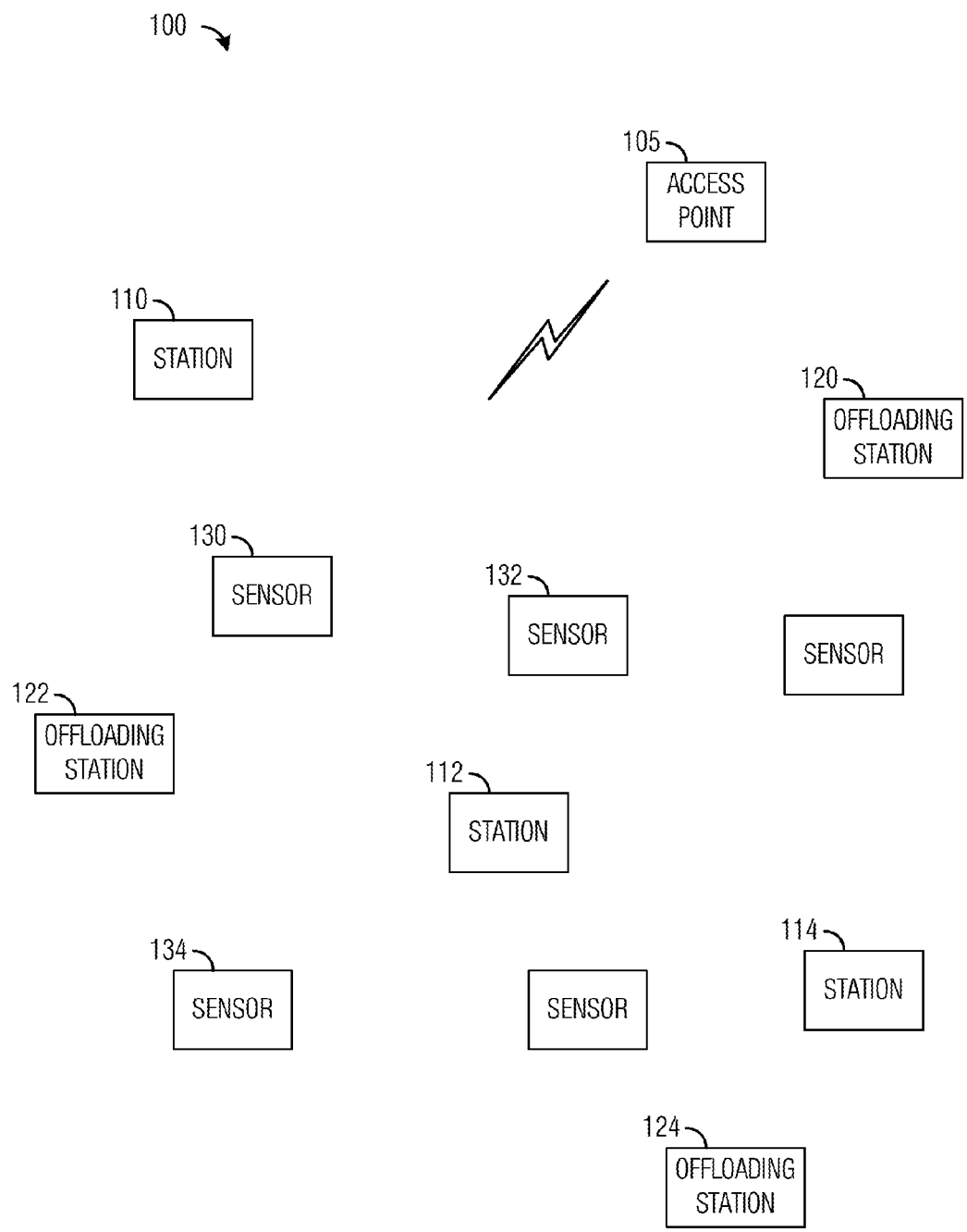
FIG. 1 illustrates an example communications system according to example embodiments described herein.

FIG. 1 illustrates a communications system 100. It is noted that communications system 100 may also be referred to as a wireless LAN (WLAN) basic service set (BSS). Communications system 100 includes an access point (AP) 105, an example of a communications controller, serving a plurality of stations (an example of communications devices). The plurality of stations may include typical stations, such as stations 110 through 114, and may include personal computers, laptops, tablets, multi-media servers, and the like. The plurality of stations may also include offloading stations, such as offloading stations 120 through 124, and may include stations that typically access services through other access networks. Examples offloading stations include cellular telephones, user equipment, and the like. The plurality of stations may also include sensors, such as sensors 130 through 134. In general, sensors are used to gather information, such as weather information, security information, position information, health information, safety information, performance information, and the like. The sensors may transmit the information through access point 105 to a server or an information aggregator. The sensors may also aggregate the information prior to transmitting the information.

While it is understood that communications systems may employ multiple access points capable of communicating with a number of stations, only a limited number of access points and stations are illustrated for simplicity.

In the IEEE 802.11 technical standards, there are two scanning techniques defined for access point/network discovery. A first technique is referred to as passive scanning. In passive scanning, a station listens to beacon frames transmitted by access points for a specified period of time. Then, according to the beacon frames, the station discovers the access points and selects one of the access points to initiate an association with the selected access point. Passive scanning does not add any additional transmissions and therefore does not negatively impact communications system overhead. A second technique is referred to as active scanning. In active scanning, a station transmits a probe request frame that includes a service set identifier (SSID) of one or more access points that the station wishes to discover. One or more access points listed in the probe request frame may send a probe response frame to the station. The probe response frame may include information about the access point as well as information about the communications system. The station may select an access point to associate with in accordance with the information contained in the probe response frames. Active scanning allows for fast access point/network discovery since the station may transmit the probe request frame as soon as it is able to obtain access to the communications channel. However, active scanning adds to communications system overhead and may negatively impact communications system efficiency.

A technique that may be used to reduce the negative impact of probe request frames and/or probe response frames used in active scanning involves the access point restricting its transmission of probe response frames. As an example, the access point may cancel the transmission of a probe response frame if a transmission of a beacon frame is already scheduled to occur within a specified time duration. Alternatively, the access point may respond to multiple similar probe request frames with a single probe response frame that uses a broadcast receiver address. However, even with the use of such a technique, the probe request and/or probe response frames may still occupy a significant amount of resources. Furthermore, coordination among neighboring access points may be difficult or infeasible in situations when access points belong to different communications system providers.

Figure 2:
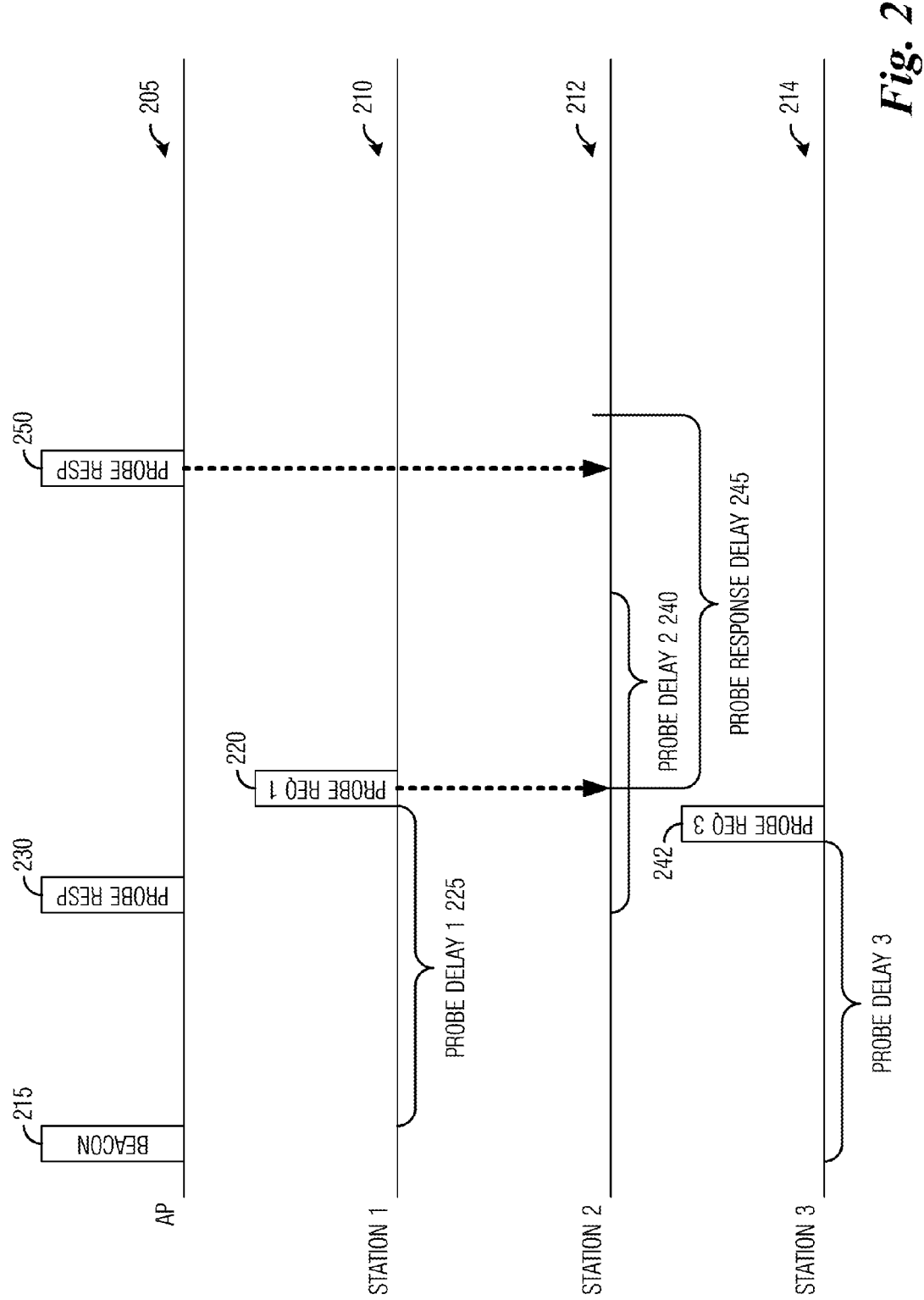
FIG. 2 illustrates an example diagram of transmissions made in a communications system according to example embodiments described herein.

FIG. 2 illustrates a diagram 200 of transmissions made in a communications system. As shown in FIG. 2, a first trace 205 represents transmissions made by an access point (AP), while second trace 210, third trace 212, and fourth trace 214 represent transmissions made by station 1, station 2, and station 3, respectively. Another technique that may be used to help reduce the negative impact of probe request frames and/or probe response frames is to have a station, e.g., station 1, defer the transmission of its probe request frame for a time period, e.g., a delay period. As an illustrative example, stations 1, 2, and 3 all attempt to scan the access point after the access point has transmitted its beacon 215. Station 1 delays the transmission of its probe request frame (PROBE REQ 1) 220 for a time period, shown in FIG. 2 as probe delay 1 225. Once the time period expires without station 1 receiving any probe request frame or probe response frame, station 1 may proceed with the transmission of its probe request frame 220. While it is deferring the transmission of its probe request frame 220 for the time period, station 1 may listen for transmissions of probe response frames by the access point. If station 1 receives a probe response frame, e.g., probe response frame 230, from the access point (in response to another station's probe request frame) and the probe response frame provides information that station 1 needs, station 1 may consider the scanning of the access point complete and not transmit its own probe request frame 220. It is noted that the probe response frame that is sent in response to another station's request frame but provides information that a station needs may be referred to as a matching probe response frame.

Yet another technique that may be used to help reduce the negative impact of probe request frames and/or probe response frames is to have a station, e.g., station 2, defer the transmission of its probe request frame for a first time period, e.g., probe delay 2 240. While it is deferring the transmission of its probe request frame for the first time period, in addition to listening for transmissions of probe response frames by the access point as described above, station 2 may also listen for transmission of probe request frames from other stations, such as probe request frame 1 220. If a probe request frame received by station 2 during the first time period covers its own request, i.e., the request in the probe request frame includes parameters, such as SSID, that station 2 would include in its own probe request frame, station 2 further defers the transmission of its probe request frame by a second time period, e.g., probe response delay 245. It is noted that the probe request frame that covers its own request may be referred to as a matching probe request frame. While it is deferring the transmission of its probe request frame for the second time period, station 2 may listen for transmission of a probe response frame that corresponds to the matching probe request frame. It is noted that as shown in FIG. 2, station 2 may also receive probe request frame 3 242, but probe request frame 3 242 may not cover the requests of station 2, for example. If station 2 receives such a probe response frame, e.g., probe response frame 250, and the probe response frame provides all of the information that station 2 needs, station 2 may consider the scanning of the access point complete.

It is noted that if station 2 does not receive a matching probe request frame or a matching probe response frame before expiration of probe delay 2 240, station 2 may transmit its own probe request frame. It is also noted that if station 2 does not receive a probe response frame that corresponds to the matching probe request frame before expiration of probe request delay 245 or if the probe response frame that corresponds to the matching probe request frame does not provide all of the information that station 2 needs, station 2 may transmit its own probe request frame.

Generally, the station may choose its own values for first time period (e.g., probe delay) and second time period (e.g., probe response delay). Since the station is choosing its own delay values, it may not have any knowledge of or an ability to consider active scanning activities experienced by the access point and/or at other stations. Therefore, the station may need to set the delay values arbitrarily or with only its own active scanning activities.

As an illustrative example, when an access point is experiencing light active scanning activity (e.g., as may be measured by a number of probe response frames generated by the access point in accordance to probe request frames from stations during a given time period), new stations have few and/or infrequent opportunities to receive probe response frames sent in response to probe request frames from other stations in the communications system. Therefore, the station may unnecessarily delay the transmission of its probe request frames, which may result in increased access point/network discovery delay, without achieving a reduction in communications system overhead. Hence, when there is light or relatively light active scanning activity, it may be beneficial for the station to transmit its probe request frame without experiencing delay.

As another illustrative example, when an access point is experiencing heavy active scanning activity, a new station may have relatively many and/or frequent opportunities to receive probe response frames sent in response to probe request frames transmitted by other stations. Therefore, it may be worthwhile for the station to delay transmission of its own probe request frame to listen for probe response frames transmitted by the access point in response to probe request frames transmitted by other stations.

According to an example embodiment, the access point may control the manner in which a station performs access point/network discovery. Since the access point knows the active scanning activity, as an example, the access point knows a number of probe request frames that it receives within a given time period, the access point knows a number of probe response frames that it transmits within a given time period, the access point knows the number of probe request frames received by neighbor access points, the access point knows the number of probe response frames transmitted by neighbor access points, or a combination thereof, the access point may be able to set the delay(s), if any, that the stations use to defer the transmission of their probe request frames to detect probe request frames from other stations and/or probe response frames from the access point. It is noted that probe request frames received by neighbor access points and/or probe response frames transmitted by neighbor access points may be reported to the access point by the neighbor access points, directly measured by the access point, or a combination thereof.

As an illustrative example, the access point may instruct a station to set a probe delay value used to defer the transmission of its probe request frame in accordance to a probability that the station may receive another station's probe request frame. The probability may be a function of measure active scanning activity experienced by the access point, for example. As an example, the access point, the access point may monitor (e.g., continuously or periodically) the number of probe response frames that it transmits during a given time period, the number of probe request frames that it receives during a given time period, or a combination thereof. As another example, the access point may monitor the number of regular and/or periodic beacon frames that it transmits. As another example, the access point may monitor the number of probe response frames (or a report thereof) that it receives from its neighboring access points.

The access point may transmit, e.g., broadcast, an indicator of its active scanning traffic condition. The indicator may be referred to as an active scanning indicator (ASI), for example. According to an example embodiment, the active scanning indicator may be a single bit indicator that is set or cleared to mandate a minimum probe delay that a station is to apply prior to transmitting its own probe request frame. The minimum probe delay may be predefined, by an operator of the communications system, a technical standard, a manufacturer, and the like. According to another example embodiment, the active scanning indicator may be a one or more bits long and indicate specific probe delay values (e.g., a probe delay value or a particular probe delay value out of a set of possible probe delay values) that the station is to apply. As an illustrative example, the set of possible probe delay values may comprise four values and the active scanning indicator may be a two-bit long value to indicate which of the four values the station is to apply. The set of possible probe delay values may be predefined, by an operator of the communications system, a technical standard, a manufacturer, and the like.

According to another example embodiment, the active scanning indicator may indicate one or more active scanning traffic conditions (e.g., one of a set of quantized active scanning traffic conditions) which may be used by the station to generate a probe delay value. As an illustrative example, the active scanning indicator may indicate that the active scanning traffic condition is very high. As a result, the station may generate a relatively small (or zero) probe delay, but due to the very high active scanning traffic condition, it still has high probability of detecting a matching probe request frame from another station. According to yet another example embodiment, the active scanning indicator may include or specify a set of probe delay values, each of which may be applied by the station in accordance to their respective type of service, type of device, class, subscription level, priority, and the like.

According to an example embodiment, the active scanning indicator may be transmitted to all stations served by the access point. According to another example embodiment, the active scanning indicator may be transmitted to a subset of stations served by the access point. As an example, the access point may transmit the active scanning indicator to stations of a specified type, specified class, specified group, specified priority level, specified subscription level, specified quality of service (QoS) requirement, and the like. According to another example embodiment, the access point may transmit different active scanning indicators to different stations. As an example, the access point may transmit a first active scanning indicator to a first group of stations, a second active scanning indicator to a second group of stations, a third active scanning indicator to a third group of stations, a fourth active scanning indicator to a fourth station. It is noted that the examples presented herein are for illustrative purposes only and are not intended to limit the scope or the spirit of the example embodiments.

Figure 3:
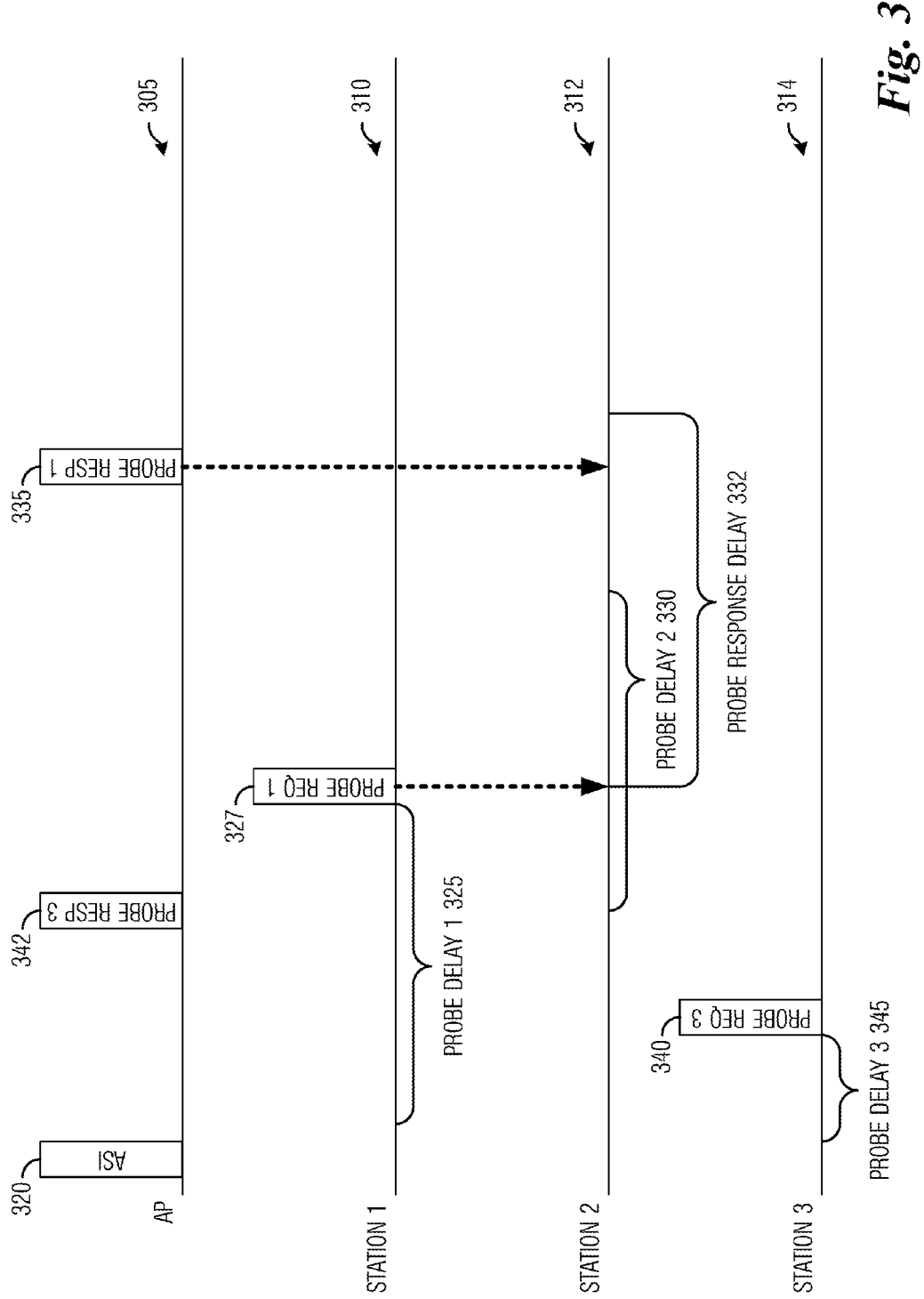
FIG. 3 illustrates an example diagram of transmissions made in a communications system where an active scanning indicator is used by an access point to statistically set the access point/network discovery behavior of stations according to example embodiments described herein.

FIG. 3 illustrates a diagram 300 of transmissions made in a communications system where an active scanning indicator is used by an access point to statistically set the access point/ network discovery behavior of stations. As shown in FIG. 3, a first trace 305 represents transmissions made by an access point, while second trace 310, third trace 312, and fourth trace 314 represent transmissions made by station 1, station 2, and station 3, respectively.

The access point transmits an active scanning indicator (ASI) 320 to indicate to stations the amount of probe delay to apply, an amount of active scanning activity, or a combination thereof. It is noted that a Short Beacon frame, which is transmitted more frequently than a regular Beacon may be well suited for transmitting ASIs, such as ASI 320. The access point may transmit ASI 320 to all of its stations, or a subset of its stations. Station 1 may apply probe delay 1 325 prior to transmitting its probe request frame (probe request frame 1) 327. Similarly, station 2 may apply probe delay 2 330 and station 3 may apply probe delay 3 345. However, before probe delay 2 330 expires, station 2 detects probe request frame 1 327 which matches its requirements, i.e., probe request frame 1 327 is the matching probe request frame for station 2. As a result, station 2 defers the transmission of its probe request frame further with another delay (probe response delay 332), which may also be indicated by ASI 320 or a different ASI. While station 2 applies probe response delay 332, the access point transmits a probe response frame (probe response frame 1 335) in response to receiving probe request frame 1 327. Station 2 is able to detect probe response frame 1 335 and determine that it matches its requirements. Therefore, station 2 deems that scanning of the access point is complete and does not need to transmit a probe request frame for the access point. It is noted that a probe request frame transmitted by station 3 (probe request frame 3 340) and its attendant probe response frame (probe response frame 3 342) may not meet requirements of either station 1 or station 2 and may be ignored by those stations.

ASI 320 may be used by the access point to statistically control or influence the number or percentage of stations that discover the access point by passively listening to Beacon frames or probe request frames of other stations compared to the number or percentage of stations that discover the access point by proactively sending probe request frames and receiving probe response frames.

The use of ASI 320 with multiple probe delay values for multiple classes of stations, quality of services (QoS), priorities, and the like, may allow the access point to control which type of stations discover the access point through passive scanning techniques and/or which types of stations discover the access point through active scanning techniques. As an example, the types of stations may be classified by quality of service (QoS) requirements, device and/or equipment types, subscription level (basic subscription versus premium subscription), user priority, and the like. As an example, the access point may set a shorter probe delay for users with higher priority and a longer probe delay for users with a lower priority. As another example, the access point may set a shorter probe delay for time-sensitive applications and a longer probe delay for delay-tolerant applications. As another example, the access point may set a shorter probe delay for battery powered devices and a longer probe delay for grid-powered devices.

Figure 4:
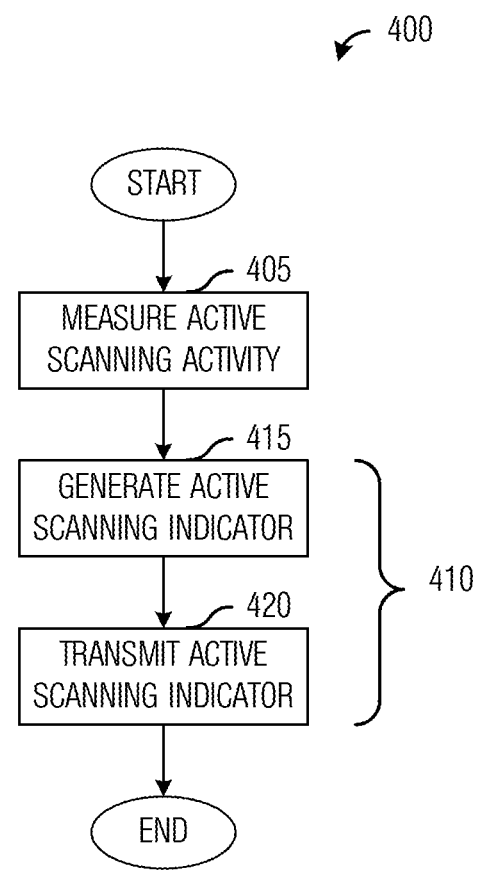
FIG. 4 illustrates an example flow diagram of operations occurring in an access point as the access point sets the access point/network discovery behavior of stations according to example embodiments described herein.

FIG. 4 illustrates a flow diagram of operations 400 occurring in an access point as the access point sets the access point/network discovery behavior of stations. Operations 400 may be indicative of operations occurring in an access point, such as access point 105, as the access point sets the access point/network discovery behavior of stations served by the access point.

Operations 400 may begin with the access point measuring an active scanning activity or condition (block 405). As discussed previously, the access point may measure the active scanning activity by measuring probe request frames received by the access point over a given period of time, measuring probe response frames transmitted by the access point over a given period of time, measuring the number of regular and/or periodic beacon frames that it transmits over a given period of time, measuring the number of probe response frames that it receives from its neighboring access points over a given period of time, or a combination thereof.

The access point may statistically specify (or similarly, statistically control) the access point/network discovery behavior of the station(s) (blocks 410). The access point may statistically specify the access point/network discovery behavior of the station(s) by generating an active scanning indicator from the active scanning activity (block 415) and transmitting the active scanning indicator to at least some of its stations (block 420). As discussed previously, the active scanning indicator may be representative of a delay that the station(s) is to apply, a representation of the measured active scanning activity or condition, or a combination thereof. The access point may transmit (e.g., broadcast) the active scanning indicator to its stations, however, the active scanning indicator may be intended for a subset of the stations, such as a specific station, a group of stations, a specific type of stations, stations with a specific subscription type or level, stations with a specific priority, and the like.

Figure 5A:
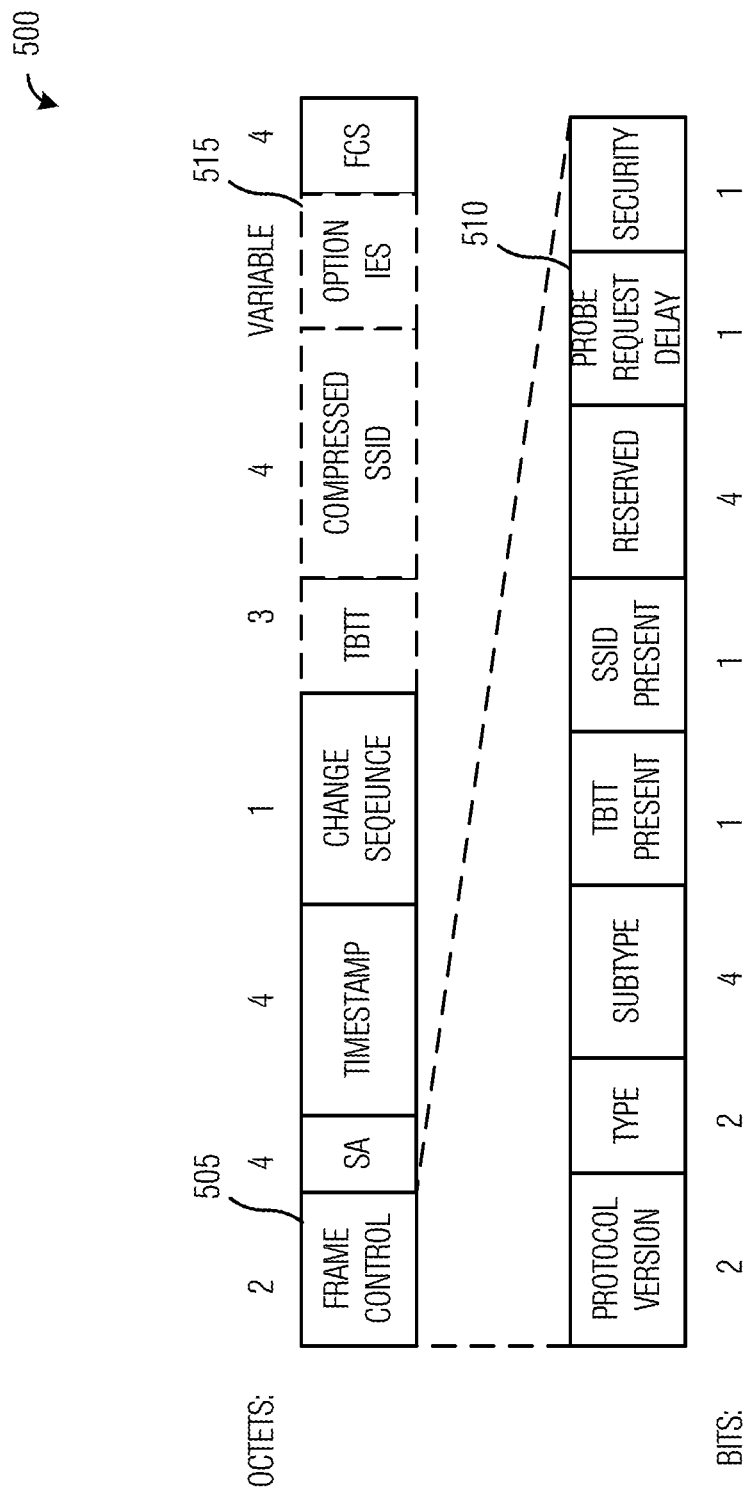
FIG. 5a illustrates a first example short beacon frame according to example embodiments described herein.

FIG. 5a illustrates a first example short beacon frame 500. Short beacon frame 500 includes a frame control field 505, which includes a single bit active scanning indicator (shown as probe request delay 510). It is noted that longer active scanning indicators may also be carried in frame control field 505. As shown in FIG. 5a, the active scanning indicator being located in frame control field 505 may imply that the active scanning indicator is transmitted each time short beacon frame 500 is transmitted. However, it may be possible to utilize an additional short beacon frame configuration to allow for less frequent transmission of the active scanning indicator, such as every other short beacon frame, every third short beacon frame, and the like.

Figure 5B:
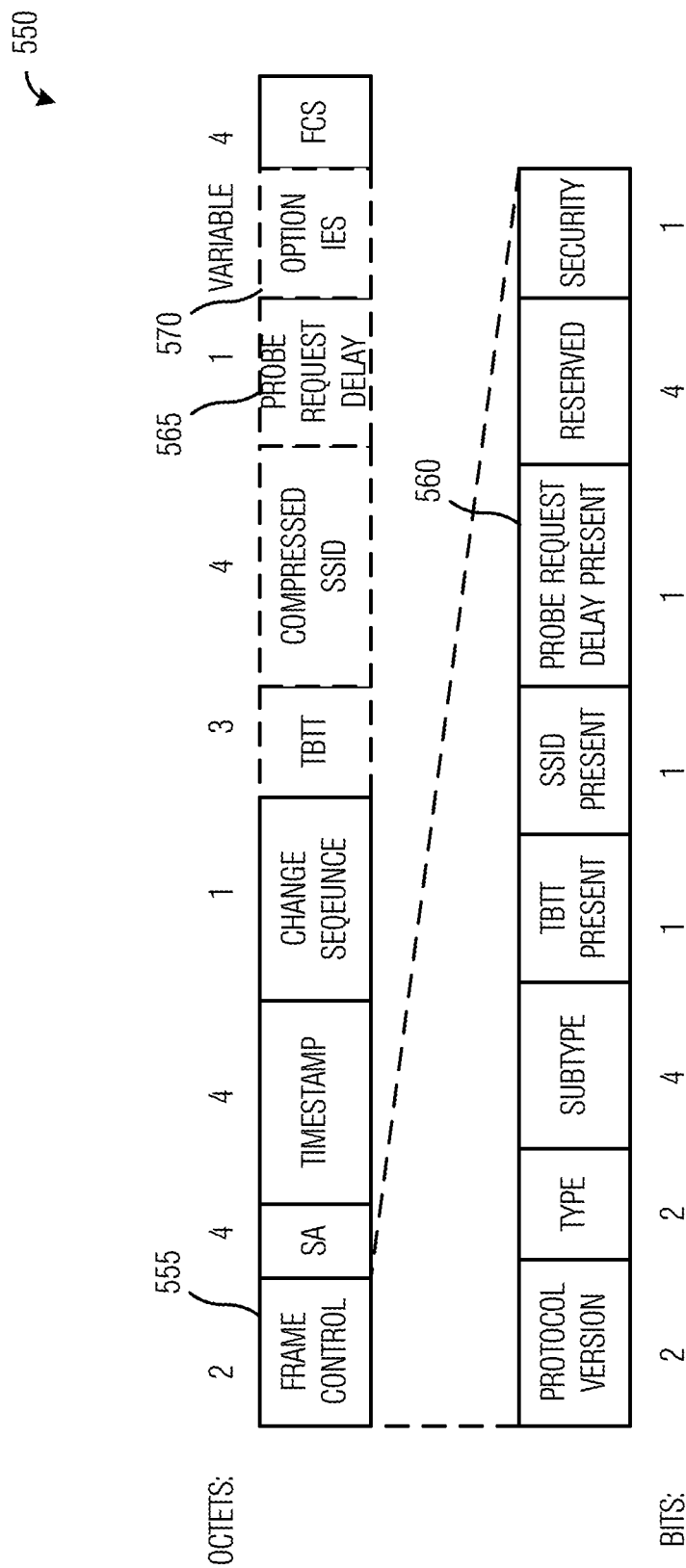
FIG. 5b illustrates a second example short beacon frame according to example embodiments described herein.

FIG. 5b illustrates a second example short beacon frame 550. Short beacon frame 550 may be used when the active scanning indicator is a multi-bit sequence, which may be too long to reside in frame control field 555. Instead of locating the active scanning indicator in frame control field 555, a single bit probe request delay present indicator 560 is located in frame control field 555. Probe request delay present indicator 560 being set to a specified value may indicate to a recipient of short beacon frame 550 to look in short beacon frame 550 to find a value(s) of probe delay, e.g., located in field probe request delay field 565. It is noted that probe request delay field 565 may include multiple probe delay values.

Figure 6:
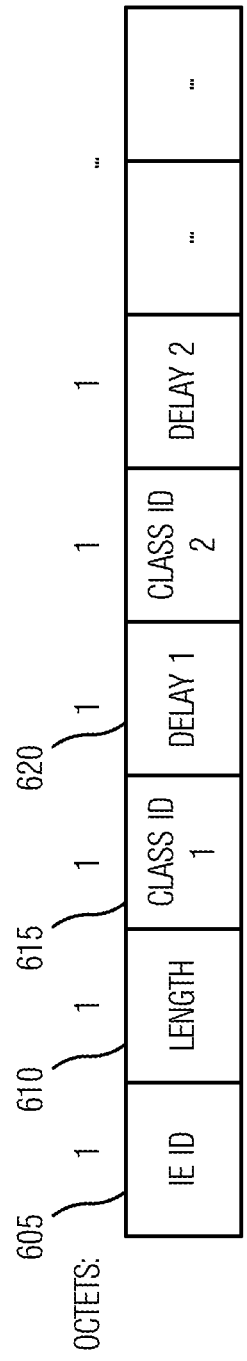
FIG. 6 illustrates an example IE that carries the active scanning indicator according to example embodiments described herein.

According to an example embodiment, the active scanning indicator may be in the form of an information element (IE). As an example, the active scanning indicator (in the form of an IE) may be located in option IEs field 515 of short beacon frame 500 and option IEs field 570 of short beacon frame 550. FIG. 6 illustrates an example IE 600 that carries the active scanning indicator. IE 600 may include an IE ID field 605 which indicates IE type, a length field 610 which indicates the length of IE 600, one or more delay fields (such as delay 1 620) which carries a delay value and one or more class ID fields (such as class ID field 615) which indicates the class (or type) identifier of the stations that should apply the corresponding Probe Delay value.

Figure 7:
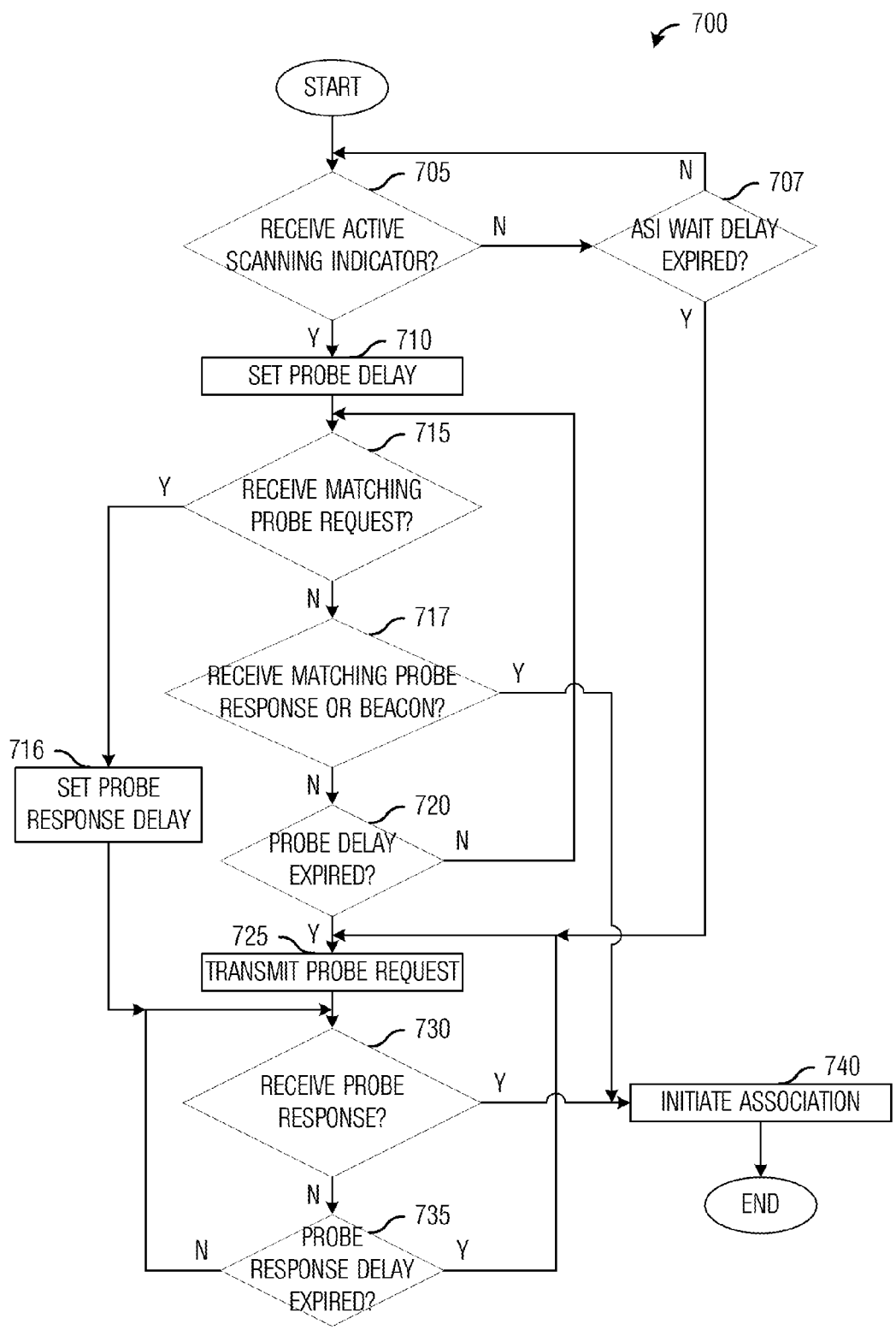
FIG. 7 illustrates an example flow diagram of operations occurring in a station as the station performs access point/network discovery according to example embodiments described herein.

FIG. 7 illustrates a flow diagram of operations 700 occurring in a station as the station performs access point/network discovery. Operations 700 may be indicative of operations occurring in a station, such as stations 110-134, as the station performs access point/network discovery.

Operations 700 may begin with the station performing a check to determine if it has received an active scanning indicator (block 705). As discussed previously, the active scanning indicator may be broadcast periodically, such as every short beacon, every few short beacons, and the like, or at specified times. If the station receives an active scanning indicator, it may set its probe delay accordingly in order to delay a transmission of its probe request (block 710). The station may delay the transmission by an amount equal to the probe delay. As an illustrative example, if the active scanning indicator is a single bit value that indicates to or to not defer transmission of probe request frame(s), the station may set its probe delay to either 0 or a pre-set delay value in accordance with the value of the active scanning indicator.

If the station does not receive an active scanning indicator, the station may perform another check to determine if an ASI wait delay has expired (block 707). Generally, the station should wait for a time period equal to the ASI wait delay to allow it to determine if there are any ASI compatible access points operating in its general vicinity. If the ASI wait delay has not expired, the station returns to block 705 to repeat the check to determine if it has received an active scanning indicator. If the ASI wait delay has expired, the station may go ahead and transmit a probe request frame (block 725).

It is noted that the active scanning indicator may change the value of the probe delay. If the station has already started deferring the transmission of its own probe request frame for a period equal to a previous value of the probe delay, the station may change the value of the probe delay to the smaller of the new probe delay or what remains of the old probe delay.

While the station waits for the probe delay to expire, the station may perform a check to determine if it has received a matching probe request frame (block 715). As discussed previously, a matching probe request frame may be a probe request frame that covers the requirements of the station's own probe request frame. It is noted that the station may receive a plurality of probe request frames and that only a subset of the plurality of probe request frames may cover the requirements of the station's own probe request frame. The station may receive several probe request frames that cover the requirements of the station's own probe request frame. In such a situation, the station may use the probe request frame that it receives first, the probe request frame with a corresponding probe response frame that is received first, the probe request frame from a source station that is closest to the station, and the like.

If the station has not received a matching probe request frame (block 715), the station may perform a check to determine if it has received a matching probe response frame or a beacon (block 717). As discussed previously, if the station receives a matching probe response frame while it is deferring transmission of its probe request frame, the station may consider the scanning of an access point associated with the matching probe response frame complete. Furthermore, if the station receives a beacon frame from an AP while it is deferring transmission of its probe request, the station may consider the scanning of the AP associated with the beacon frame complete. Furthermore, if this AP is the only AP that the station intends to scan on a particular frequency channel, the station may abandon the transmission of its probe request frame on this particular frequency channel. The station may initiate association with an access point in block 740. It is noted that in some configurations, the station may tune to a different frequency channel and repeat its scanning for access points that are operating in the different frequency channel. In such a configuration, the station may scan some or all of the available frequency channels prior to selecting an access point and initiating an association with the selected access point.

If the station has not received a matching probe response frame or a beacon (block 717), the station may perform a check to determine if the probe delay has expired, i.e., the station has deferred the transmission of its own probe request frame for a period equal to the probe delay (block 720). If it has not deferred the transmission of its own probe request delay for long enough, the station may return to block 715 to continue monitoring. If the station has deferred the transmission of its own probe request frame for a period equal to the probe delay (block 720), the station may transmit its own probe request frame (block 725).

If the station has received a matching probe request frame (block 715), the station may further defer the transmission of its own probe request frame with a probe response delay (the station may set a probe response delay (block 716)) and perform a check to determine if it has received a probe response frame corresponding to the matching probe request frame (block 730). It is noted that the probe response delay may be a pre-specified value or specified in or derived from an active scanning indicator received by the station.

If the station has not received the probe response frame corresponding to the matching probe request frame, the station may perform a check to determine if it has deferred the transmission of its own probe request frame for a period equal to the probe response delay (block 735). If the station has not deferred the transmission of its own probe request frame for long enough, the station may return to block 730 to continue waiting. If the station has deferred the transmission of its own probe request frame for a period equal to the probe response delay (block 735), the station may return to block 725 to transmit its own probe request frame. If the station received the probe response frame corresponding to the matching probe request frame, the station may initiate an association utilizing information in the probe response frame and/or the matching probe request frame (block 740).

According to an example embodiment, in an overlapped BSS (OBSS) scenario, where the coverage area of multiple access points may overlap with each other, it may be desirable for each access point to indicate its own active scanning traffic activity (which may exclude probe response frames sent by neighboring access points) by transmitting its own active scanning indicator. It may also be desirable for a station to select its own probe delay when it receives multiple active scanning indicators from multiple access points. As an illustrative example, the station may elect to set its probe delay to a smallest one among all probe delays derived from the multiple active scanning indicators.

As another illustrative example, when a first access point instructs the station to delay its probe request frames by a probe delay while a second access point instructs the station to not delay its probe request frames, it is likely that the station will transmit a probe request frame (with or without deferment) with the second access point's SSID. In such a situation, immediately transmitting the probe request frame with the SSIDs of both access points is better since adding the SSID of the first access point in the probe request frame incurs only a slight incremental increase in overhead while a delay associated with discovering both access points is reduced.

Using similar reasoning, if the station receives different active scanning indicators from different access points at different times, then at a later time between two, the station may reset its probe delay to be the smaller of a remaining old probe delay and a newly initiated probe delay. As an example, if the station receives an active scanning indicator from a first access point which instructs the station to delay its probe request frame by a probe delay and then before the probe delay expires, the station receives another active scanning indicator from another access point which instructs the station to not delay its probe request frame, the station may negate the earlier instruction about delaying the probe request frame and immediately transmit its probe request frame to both access points.

Figure 8A:
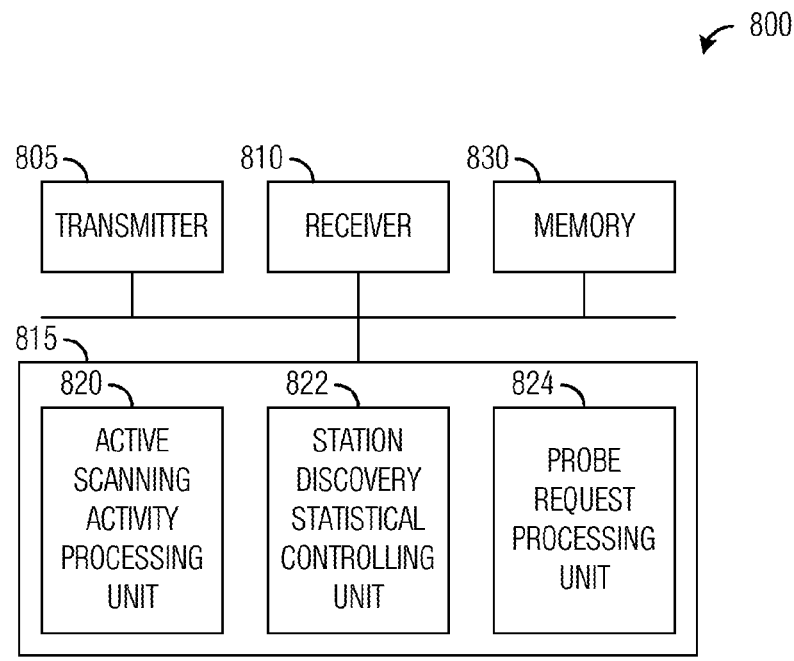
FIG. 8a illustrates an example first communications device according to example embodiments described herein.

FIG. 8a illustrates a first communications device 800. Communications device 800 may be an implementation of a communications controller, such as a base station, an access point, a NodeB, an eNB, a base terminal station, and the like. Communications device 800 may be used to implement various ones of the embodiments discussed herein. As shown in FIG. 8a, a transmitter 805 is configured to transmit Beacon frames, Short Beacon frames, active scanning indicators, probe response frames, and the like. Communications device 800 also includes a receiver 810 that is configured to receive packets, probe request frames, and the like.

Figure 8B:
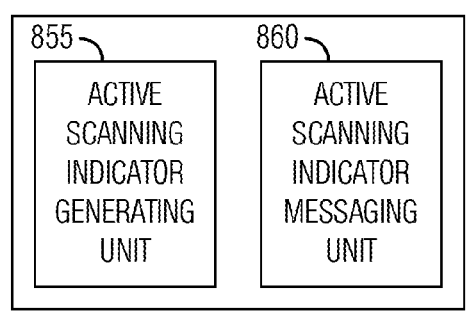
FIG. 8b illustrates a detailed diagram of an example station discovery statistical controlling unit according to example embodiments described herein.

An active scanning activity processing unit 820 is configured to measure active scanning activity and/or load from received probe request frames, transmitted probe response frames, and the like. Active scanning activity processing unit 820 is also configured to measure active scanning activity and/or load from transmitted probe response frames from other communications controllers. A station discovery statistical controlling unit 822 is configured to statistically control the scanning behavior of stations. Station discovery statistical controlling unit 822 is configured to generate an active scanning indicator from measured active scanning activities and to generate a message containing the active scanning indicator. FIG. 8b illustrates a detailed diagram of an example station discovery statistical controlling unit 850, including an active scanning indicator generating unit 855 and an active scanning indicator messaging unit 860.

Referring back now to FIG. 8a, a probe request processing unit 824 is configured to process a received probe request frame and to generate a probe response frame in accordance with the probe request frame. A memory 830 is configured to store Beacon frames, Short Beacon frames, measured active scanning activity, active scanning indicators, probe request frames, probe response frames, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while active scanning activity processing unit 820, station discovery statistical controlling unit 822, and probe request processing unit 824 may be software modules executing in a microprocessor (such as processor 815) or a custom circuit or a custom compiled logic array of a field programmable logic array. Active scanning activity processing unit 820, station discovery statistical controlling unit 822, and probe request processing unit 824 may be modules stored in memory 830.

Figure 9:
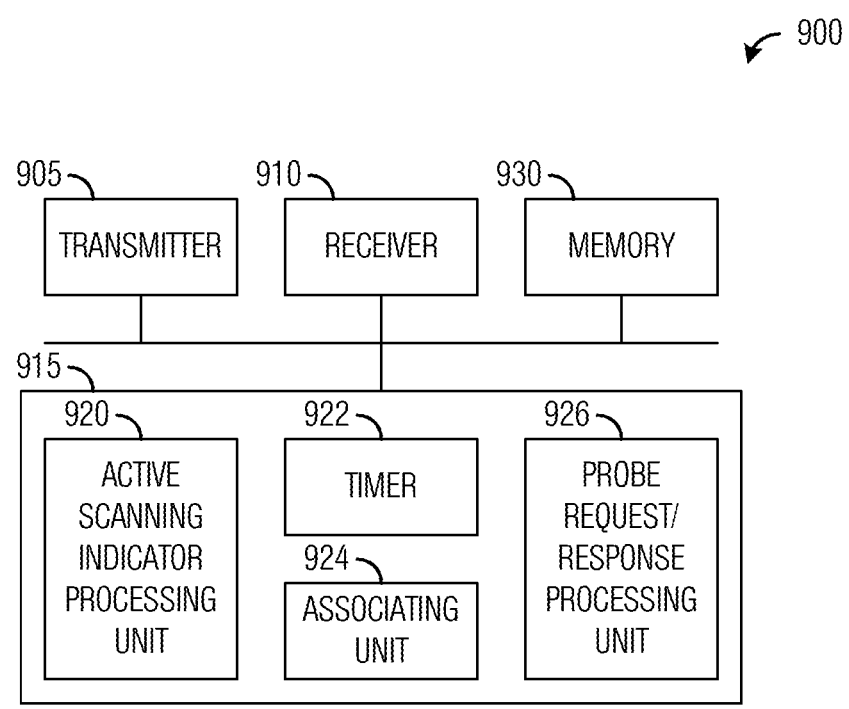
FIG. 9 illustrates an example second communications device according to example embodiments described herein.

FIG. 9 illustrates a second communications device 900. Communications device 900 may be an implementation of a station, such as mobile station, a mobile, a user, a terminal, a subscriber, a user equipment, and the like. Communications device 900 may be used to implement various ones of the embodiments discussed herein. As shown in FIG. 9, a transmitter 905 is configured to transmit probe request frames, and the like. Communications device 900 also includes a receiver 910 that is configured to receive packets, beacon frames, short beacon frames, probe response frames, and the like.

An active scanning indicator processing unit 920 is configured to process a received active scanning indicator, including to set a probe delay and/or a probe response delay according to the active scanning indicator if the active scanning indicator indicates a delay value. Active scanning indicator processing unit 920 is also configured to derive a probe delay and/or a probe response delay from the active scanning indicator if the active scanning indicator indicates a level of active scanning activity or load. A timer 922 is configured to keep track of elapsed time. Timer 922 is set with a probe delay and/or a probe response delay and may inform communications device 900 when it expires. An associating unit 924 is configured to perform control used to associate communications device 900 with an access point. A probe request/probe response processing unit 926 is configured to process received probe request frames to determine if the requirements of the receive probe request frames covers the requirements of communications device 900. Probe request/probe response processing unit 926 is configured to process received probe response frames to determine if information in received probe response frames provide information needed by communications device 900. Probe request/probe response processing unit 926 is configured to generate a probe request frame including the requirements of communications device 900. A memory 930 is configured to store Beacon frames, Short Beacon frames, active scanning indicators, probe request frames, probe response frames, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while active scanning indicator processing unit 920, timer 922, associating unit 924, and probe request/probe response processing unit 926 may be software modules executing in a microprocessor (such as processor 915) or a custom circuit or a custom compiled logic array of a field programmable logic array. Active scanning indicator processing unit 920, timer 922, associating unit 924, and probe request/probe response processing unit 926 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for discovering an access point of a communications system, the method comprises:
receiving, by a station, an active scanning indicator;
delaying, by the station, transmission of a probe request of the station for a first amount of time in accordance with the active scanning indicator;
determining, by the station, if the station is able to receive a matching probe request of a neighbor station during the first amount of time;
delaying, by the station, transmission of the probe request for a second amount of time if the station is able to receive the matching probe request during the first amount of time;
determining, by the station, if the station is able to receive a probe response corresponding to the matching probe request during the second amount of time; and
transmitting, by the station, the probe request if the station is not able to receive the probe response corresponding to the matching probe request during the second amount of time.

2. The method of claim 1, further comprising transmitting the probe request if the station is not able to receive the matching probe request during the first amount of time.

3. The method of claim 1, wherein the active scanning indicator indicates a level of active scanning activity, and wherein the method further comprises deriving the first amount of time from the active scanning indicator.

4. The method of claim 1, wherein the active scanning indicator indicates a time value, and wherein the method further comprises setting the first amount of time to the time value.

5. The method of claim 1, wherein the active scanning indicator indicates one of a plurality of time values.

6. The method of claim 1, wherein the active scanning indicator is received from a first access point.

7. The method of claim 1, wherein the probe request is transmitted to a second access point.

8. The method of claim 1, wherein the probe response corresponding to the matching probe request is received from a third access point, and wherein the method further comprises associating with the third access point.

9. A station comprising:
a receiver configured to receive an active scanning indicator;
a processor operatively coupled to the receiver, the processor configured to delay transmission of a probe request of the station for a first amount of time in accordance with the active scanning indicator, to determine if the station is able to receive a matching probe request of a neighbor station during the first amount of time, to delay transmission of the probe request for a second amount of time if the station is able to receive the matching probe request during the first amount of time, and to determine if the station is able to receive a probe response corresponding to the matching probe request during the second amount of time; and
a transmitter operatively coupled to the processor, the transmitter configured to transmit the probe request if the station is not able to receive the probe response corresponding to the matching probe request during the second amount of time.

10. The station of claim 9, wherein the transmitter is configured to transmit the probe request if the station is not able to receive the matching probe request during the first amount of time.

11. The station of claim 9, wherein the active scanning indicator indicates a level of active scanning activity, and wherein the processor is configured to derive the first amount of time from the active scanning indicator.

12. The station of claim 9, wherein the active scanning indicator indicates a time value, and wherein the processor is configured to set the first amount of time to the time value.

13. The station of claim 9, wherein the transmitter is configured to transmit the probe request to an access point.

* * * * *